UNITED STATES PATENT OFFICE.

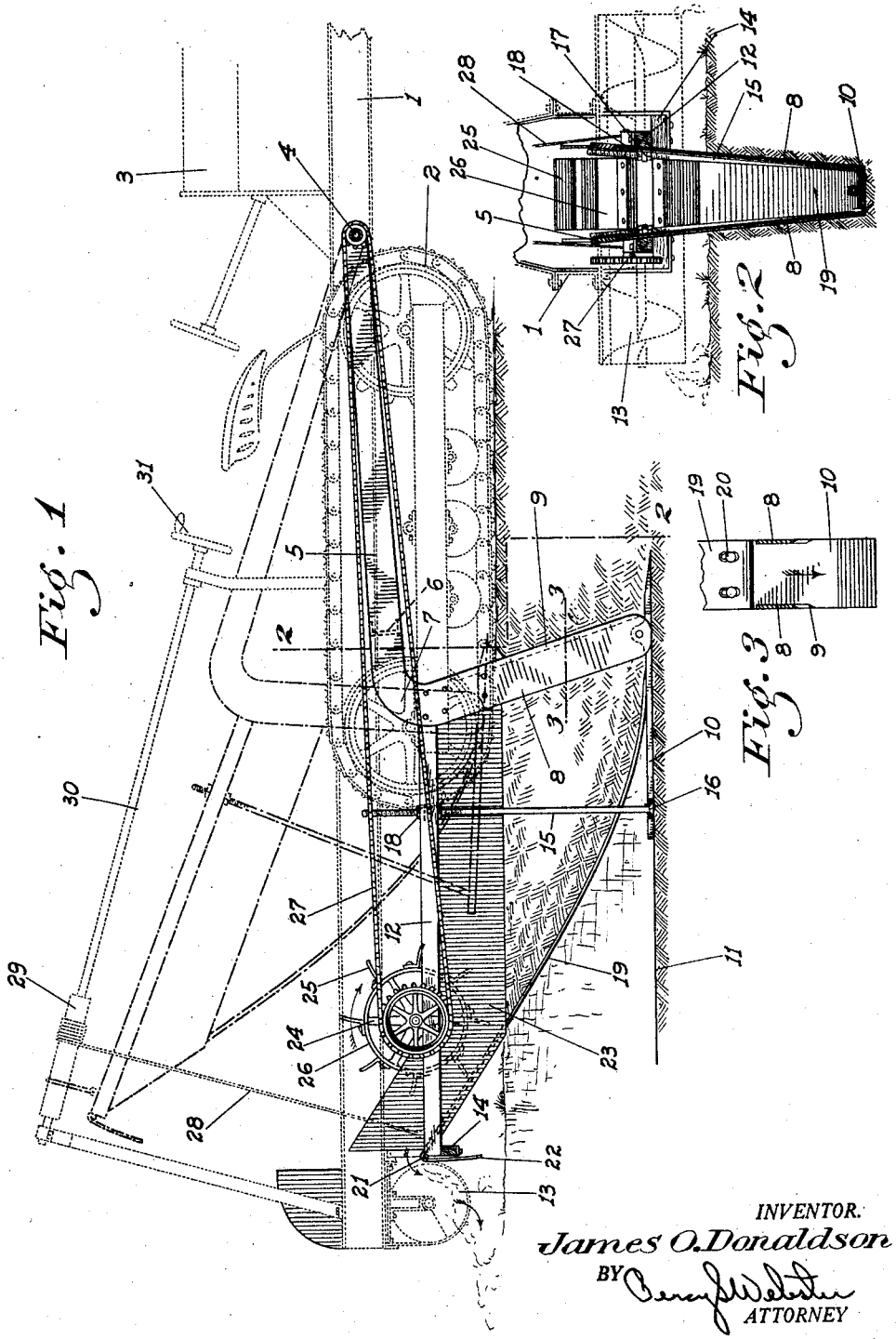

JAMES O. DONALDSON, OF STOCKTON, CALIFORNIA.

DITCHING-MACHINE.

1,391,765.  Specification of Letters Patent.  Patented Sept. 27, 1921.

Application filed April 5, 1920. Serial No. 371,356.

*To all whom it may concern:*

Be it known that I, JAMES O. DONALDSON, a citizen of the United States, residing at Stockton, in the county of San Joaquin, State of California, have invented certain new and useful Improvements in Ditching-Machines; and I do declare the following to be a full, clear, and exact description of the same, reference being had to the accompanying drawings, and to the characters of reference marked thereon, which form a part of this application.

This invention relates to improvements in ditching machines, the principal object of the invention being to provide a machine especially adapted for use in peat land and similar ground, in which the digging mechanism is rigid and remains relatively stationary, and which may be adjusted to dig at different depths, or raised out of the ground entirely.

Another object is to provide a means for raising the dirt cut by the digging members and insuring that it will positively be diverted into a fixed conveyer regardless of the level at which the device may be digging.

A still further object is to so construct and arrange the parts that there will be no rotating shafts etc. within the plane of the cut dirt, so that the latter cannot abrase and wear out the bearings.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a side outline of a wheel mounted driven structure showing my improved digger mechanism mounted thereto.

Fig. 2 is a fragmentary cross section taken on a line 2—2 of Fig. 1.

Fig. 3 is a fragmentary plan-section taken on a line 3—3 of Fig. 1.

Referring now more particularly to the characters of reference on the drawings, the numeral 1 denotes longitudinal and spaced frame-beams supported at its forward end by any form of steerable wheels (not shown) and toward the rear by a wheel or track structure 2, operatively connected to be driven by any suitable power plant such as a gas engine, mounted on the frame 1 under a hood 3 thereon.

A transverse shaft 4 is pivotally mounted in the frame 1 at any suitable point, to which, inside the frame beams, are turnably mounted a pair of spaced bars 5, extending rearwardly from said shaft, being held in spaced alinement at such rear end by a cross bar 6.

At their rear ends the bars 5 turn downwardly as at 7, and have fixed thereon or formed integral therewith cutting members 8, having forward cutting edges 9, which slope forward somewhat toward the bottom, and also converge toward each other toward the bottom, At their lower end and extending rearwardly therefrom is pivoted a horizontal cutting blade 10 adapted to lie flat on the bottom of a ditch 11 being dug.

By means of the cutting members 8 and 10, the sides and bottom of the ditch will all be positively cut with the forward movement of the machine, and the sides and bottom will be smooth and true.

Rigid frame beams 12 are fixed to the rear ends of the bars 6 and extend rearwardly therefrom, terminating adjacent a transverse driven conveyer 13 of the auger or other suitable form, adapted to convey the dirt both ways, and resting on a cross beam 14 suspended from the frame 1 when the digging mechanism is in its lowest position.

Adjustment rods 15 in alinement with the blades 8 and to the rear thereof, are flexibly fixed to the horizontal cutting member 10, as indicated at 16, and extend upwardly through bosses 17 on the beams 12, there being nuts 18 on the rods on both sides of the bosses, so that when the digger mechanism is set at different levels, the member 10 may be adjusted to maintain a truly horizontal position.

Sloping upwardly from the member 10 and conforming to the cross sectional shape of the ditch as formed by the cutters 8 is a runway plate 19, flexibly connected to said member 10 for slight longitudinal movement relative thereto as shown at 20.

The upper end of the plate 19 extends to the rear end of the beams 12 and is hung on a transverse shaft 21, and terminates in an apron 22 depending downwardly between the cross beam 14 and the conveyer 13.

This apron is for the purpose of preventing any dirt from falling between said conveyer and beam when the digging mechanism is raised to dig at a lesser depth.

Side plates 23 are fixed to the beams 12 and depend downwardly to form a trough with the plate 19 above the ground level.

In practice, the dirt dug by the cutters will be forced up the runway 19 with the forward progress of the machine, and into the conveyer 13, but in order to aid the progress of the dirt and to lessen the pulling strain of raising the dirt all the way, I mount a wheel 24 between the beams 12, near the upper end of the runway, having transverse blades or paddles 25 thereon. These blades are radially fixed on a solid ring 26 extending closely between the plates 23, so that no dirt can pass thereby and lodge near the center of the wheel and get in the bearings. The blades 25 terminate short of the runway, and with the rotation thereof in the proper direction will positively engage the dirt pushed up onto the runway and discharge the same over the top of the runway and into the conveyer.

The wheel 24 is driven from the pivotal connection 4 of the digging structure with the main frame by means of a chain or other drive such as is shown at 27, the power for said drive being of course applied at the shaft 4, since the entire digging mechanism moves about such point.

To raise and lower the digger mechanism, any suitable device may be used, such as cables 28 fastened to the beams 12 and extending to a drum 29 mounted on a shaft 30 turnably mounted to the frame 1, such shaft being turned by a handwheel 31 suitably positioned.

The drum and its shaft are positioned high enough above the frame 1 so that the digger structure may be raised entirely free of the ground a desired distance.

From the foregoing description it will be readily seen that I have produced such a device as substantially fulfils the object of the invention as set forth herein.

While this specification sets forth in detail the present and preferred construction of the device still in practice such deviations from such detail may be resorted to as do not form a departure from the spirit of the invention, as defined by the appended claims.

Having thus described my invention what I claim as new and useful and desire to secure by Letters Patent is:—

1. A ditching machine comprising a driven wheel-mounted frame, a digging mechanism mounted to the frame, means for altering the digging level of said mechanism, a fixed conveyer on the frame, independent of the digging mechanism, a runway fixed to the digging mechanism leading from the bottom level of the ditch being dug to the conveyer, and an apron formed with said runway and depending downwardly against the outside of the conveyer, the runway being free for vertical movement at the conveyer end thereof.

2. A ditching machine comprising a wheel mounted frame, beams pivotally mounted adjacent the forward end thereof and extending rearwardly, extensions projecting downwardly from the rear ends of the beams and sharpened on their forward edges to cut the sides of a ditch, and a horizontal cutting member mounted between said extensions at their lower ends.

In testimony whereof I affix my signature.

JAMES O. DONALDSON.